(12) United States Patent
Fujii

(10) Patent No.: US 11,050,137 B2
(45) Date of Patent: Jun. 29, 2021

(54) ELECTRONIC DEVICE

(71) Applicant: JVCKENWOOD CORPORATION, Yokohama (JP)

(72) Inventor: Toshikazu Fujii, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/887,117

(22) Filed: May 29, 2020

(65) Prior Publication Data

US 2020/0381806 A1 Dec. 3, 2020

(30) Foreign Application Priority Data

May 31, 2019 (JP) .............................. JP2019-102106

(51) Int. Cl.
*H01Q 1/24* (2006.01)
*H04M 1/02* (2006.01)
*H04B 1/3827* (2015.01)

(52) U.S. Cl.
CPC ........... *H01Q 1/242* (2013.01); *H04B 1/3833* (2013.01); *H04M 1/026* (2013.01)

(58) Field of Classification Search
CPC .......... H01Q 1/242; H01Q 1/12; H01Q 1/241; H04B 1/3833; H04M 1/026
See application file for complete search history.

(56) References Cited

U.S. PATENT DOCUMENTS

| 5,276,454 A | * | 1/1994 | Gonzalez | ............... | H01Q 1/242 343/702 |
| 5,907,307 A | * | 5/1999 | Bickert | .................. | H01Q 1/245 343/702 |
| 2012/0026046 A1 | * | 2/2012 | Bit-Babik | ............ | H01Q 9/0421 343/702 |
| 2015/0147982 A1 | * | 5/2015 | Aihsan | ................. | H04B 1/3827 455/90.2 |

FOREIGN PATENT DOCUMENTS

JP H6-125290 A 5/1994

* cited by examiner

*Primary Examiner* — Nguyen T Vo
(74) *Attorney, Agent, or Firm* — Procopio, Cory, Hargreaves & Savitch LLP

(57) ABSTRACT

To provide an electronic device having an antenna function without having to enlarge the size of the device. The electronic device includes a shielding case, a feeding loop, an operation knob, and an antenna element. The shielding case blocks passage of electromagnetic waves. The feeding loop is a conductor that is disposed annularly along a prescribed plane outside the shielding case and is connected to a radio communication circuit encompassed within the shielding case. The operation knob is configured to be rotatable around a specific axis that passes through an annular ring formed by the feeding loop. The antenna element is an open-loop conductor fixed to the operation knob.

5 Claims, 3 Drawing Sheets

ELECTRONIC DEVICE

CROSS REFERENCE TO RELATED APPLICATION

This application is based upon and claims the benefit of priority from Japanese patent application No. 2019-102106, filed on May 31, 2019, the disclosure of which is incorporated herein in its entirety by reference.

BACKGROUND

The present disclosure relates to an electronic device.

For electronic devices having functions of transmitting/receiving radio waves, there is a demand for an antenna large enough to perform the functions. On the other hand, there is a demand to downsize the antenna for portable electronic devices as much as possible so as to realize satisfactory handling of the electronic devices. Various proposals are being made to satisfy both of these demands that seem to be mutually contradictory.

For example, a portable small radio equipment disclosed in Unexamined Japanese Patent Application Publication No. H06-125290 has a square-like recessed part provided on a back surface of a radio equipment case and one side of a planar antenna exclusive for reception is rotatably attached to one side of an inside surface of the recessed part, and the antenna is accommodated in the recessed part when the radio equipment is held vertically while talking.

In an electronic device that requires its case to have an electromagnetic shielding property, since a communication circuit disposed inside the case is covered by an electromagnetic wave shield, it is not possible to provide a built-in antenna. However, when the technique disclosed in Unexamined Japanese Patent Application Publication No. H06-125290 is adopted, the back surface of the case of the radio equipment becomes large as a result thereof.

SUMMARY

An electronic device according to an embodiment of the present disclosure includes a shielding case, a feeding loop, an operation knob, and an antenna element. The shielding case blocks passage of electromagnetic waves. The feeding loop is a conductor that is disposed annularly along a prescribed plane outside the shielding case and is connected to a radio communication circuit encompassed within the shielding case. The operation knob is configured to be rotatable around a specific axis that passes through an annular ring formed by the feeding loop. The antenna element is an open-loop conductor fixed to the operation knob.

By this structure, the operation knob that is protruded so as to function as an operation unit can be used as an antenna in the electronic device.

According to an embodiment of the present disclosure, an electronic device having an antenna function in an electronic device having functions of transmitting/receiving radio waves can be provided without having to enlarge the size of the device.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
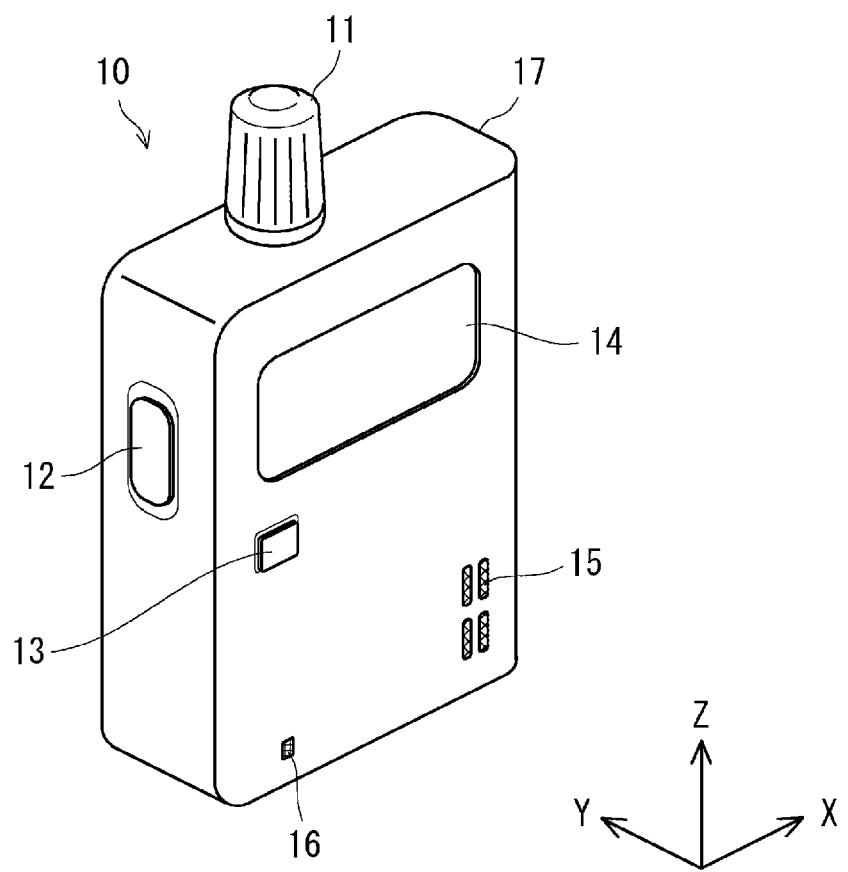
FIG. 1 is an outline view of an electronic device according to an embodiment.

For clarifying the explanation, the following description and the drawings are partially omitted and simplified where appropriate. In the respective drawings, the same or corresponding components will be denoted by the same reference numerals, and, for convenience of description, duplicated explanations thereof will be omitted as needed.

Embodiments

Hereinbelow, embodiments of the present disclosure are explained with reference to the drawings. FIG. 1 is an outline view of an electronic device according to an embodiment. An electronic device 10 according to an embodiment of the present disclosure is a transceiver that performs transmission/reception of radio waves. Note that although the electronic device 10 is referred to as a transceiver, it is not limited thereto and may be any device that performs transmission/reception of radio waves such as a mobile phone, a smartphone, or the like.

Figure 2:
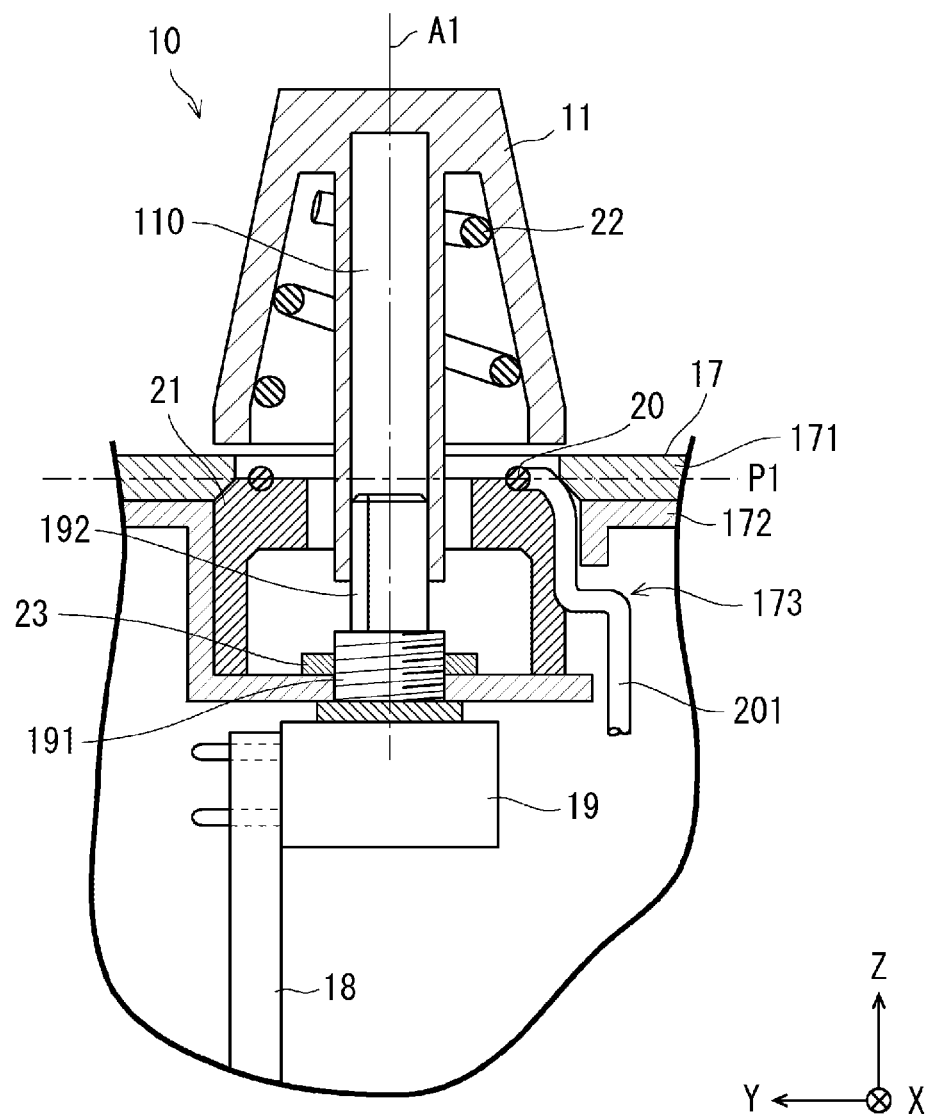
FIG. 2 is a sectional diagram of an operation knob part of the electronic device according to the embodiment.

Note that for the sake of convenience in explaining the positional relationship of the structural components, FIG. 1 is indicated by a right-handed orthogonal coordinate system. Further, in the case where an orthogonal coordinate system is shown in FIG. 2 and the subsequent drawings, X-axis, Y-axis, and Z-axis directions thereof are the same as X-axis, Y-axis, and Z-axis directions shown in FIG. 1.

The electronic device 10 has a configuration in which a cylindrical operation knob 11 protrudes from a case having a substantially rectangular shape, and a size thereof is a portable size. The electronic device 10 includes the operation knob 11, a transmission button 12, a channel selection button 13, a display panel 14, a speaker unit 15, a microphone unit 16, and a case 17 as main components that are visible from the outside. A surface that is on the Y-axis negative side and is parallel to an XZ plane is the front surface of the electronic device 10, and a surface that is on the Y-axis positive side and is parallel to the XZ plane is the back surface of the electronic device 10. Further, a surface that is on the Z-axis positive side and is parallel to an XY plane is the top surface of the electronic device 10, and a surface that is on the Z-axis negative side and is parallel to the XY plane is the bottom surface of the electronic device 10. A surface that is on the X-axis positive side and is parallel to the YZ plane is the right side surface of the electronic device 10, and a surface that is on the X-axis negative side and is parallel to the YZ plane is the left side surface of the electronic device 10.

The operation knob 11 serves as a power switch for turning on/off the power of the electronic device 10 and an operation unit for adjusting a volume of a voice output from the speaker. The operation knob 11 is a cylindrical protrusion that is configured so as to protrude from the top surface of the case 17 having a substantially rectangular shape, and it is rotatably locked to the top surface of the case 17. The operation knob 11 is formed by molding a dielectric body made of resin or the like, and operations such as on/off of the power, adjustment of a volume of a voice output from the speaker, etc. are performed by the user operating the operation knob 11.

The transmission button 12 is a button that is pressed when transmitting a voice from the electronic device 10 which is a transceiver. When the user is transmitting his/her voice to a person to whom he/she is talking, the user speaks toward the microphone unit 16 while pressing the transmission button 12.

The channel selection button 13 is a button for selecting a transmission/reception frequency of a call by performing a prescribed operation. The display panel 14 is a display for notifying the user of various pieces of information such as the channel number that is selected and the operation state and the remaining amount of the battery of the electronic device 10. The speaker unit 15 is a hole provided in the case 17, and outputs a voice of the user from the speaker disposed inside the case 17 through the hole. The microphone unit 16 is a hole provided in the case 17, and is configured such that an utterance of the user is picked up by a microphone disposed inside the case 17.

The case 17 is a case made of resin and has a substantially rectangular shape. The case 17 has the operation knob 11 disposed on the top surface thereof, the display panel 14, the channel selection button 13, the speaker unit 15, and the microphone unit 16 disposed on the front surface thereof, and the transmission button 12 disposed on the side surface thereof.

Figure 3:
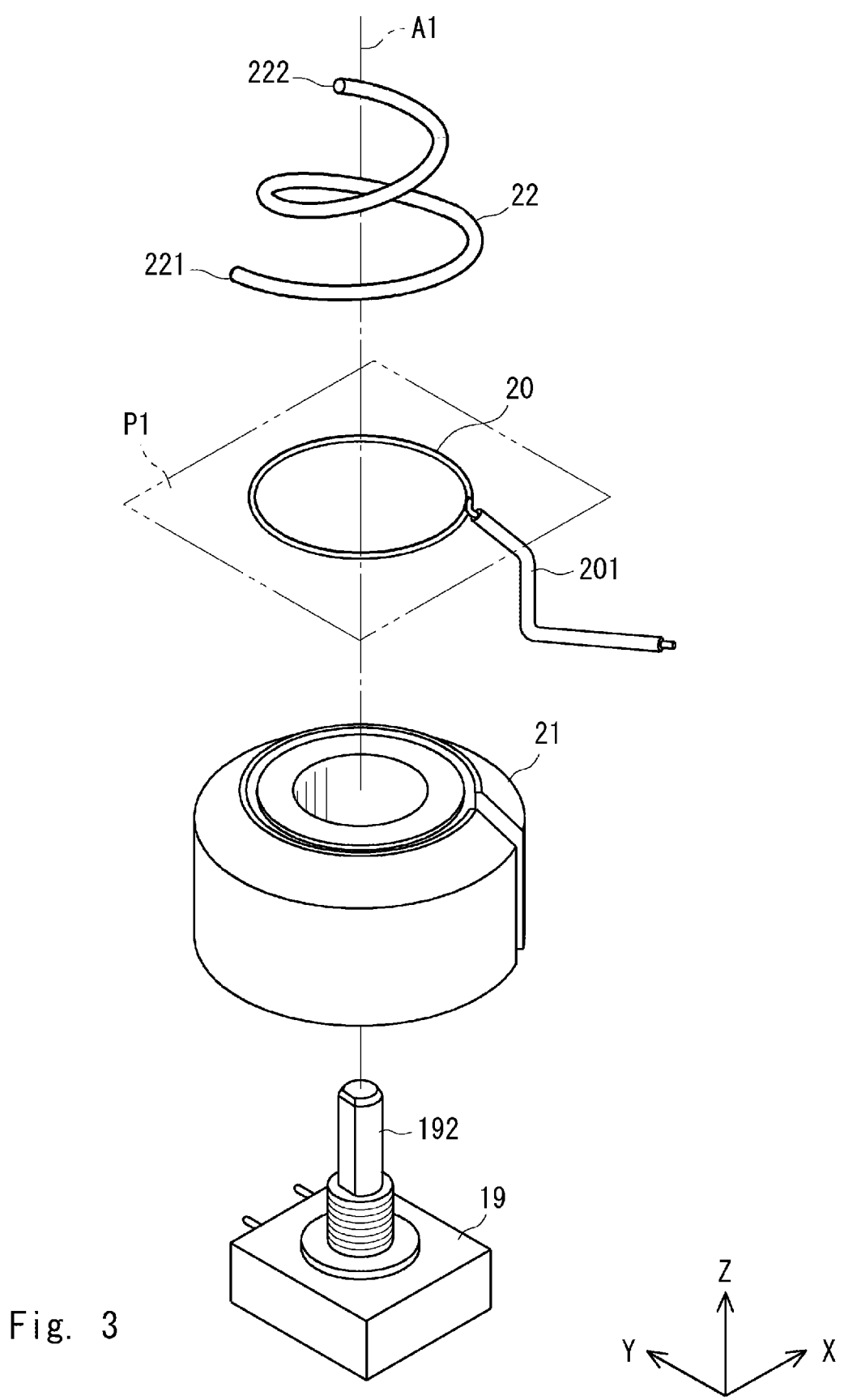
FIG. 3 is an exploded perspective view of an antenna part of the electronic device according to the embodiment.

Next, the configuration of the operation knob 11 and the structure inside the operation knob 11 are explained with reference to FIGS. 2 and 3. FIG. 3 is an exploded perspective view of an antenna part of the electronic device according to the embodiment.

FIG. 2 is a sectional diagram of an operation knob part of the electronic device according to the embodiment. FIG. 2 is a sectional diagram showing the operation knob 11 cut out along the YZ plane. As shown in the figures, the electronic device 10 includes a circuit board 18, an encoder 19, a feeding loop 20, a spacer 21, and an antenna element 22 etc. inside the case 17.

The case 17 is constituted of a resin case 171 and a shielding case 172. The resin case 171 is a case formed of molded resin. The shielding case 172 is a metal case structured inside the resin case 171.

The shielding case 172 is an electromagnetic wave shield for suppressing intrusion of the electromagnetic waves present outside the electronic device 10 into the electronic device 10. The shielding case 172 is formed by press working a metal plate for suppressing predetermined electromagnetic waves from entering the electromagnetic device or is formed by pouring aluminum into a mold. In the embodiment of the present disclosure, the shielding case 172 has a substantially rectangular shape (a hexahedron) and is configured to encompass various structures such as the radio communication circuit etc. Further, the shielding case 172 has a recessed part as shown in FIG. 2. The encoder 19 is fixed to a bottom part of the recessed part formed to the shielding case 172. The spacer 21 is fitted to the recessed part.

The circuit board 18 is provided with a circuit for the electronic device 10 to perform various functions. For example, the circuit board 18 includes a radio communication circuit for performing transmission and reception of a signal. The radio communication circuit of the circuit board 18 is connected to a coaxial cable 201. The encoder 19 is disposed to the circuit board 18.

The encoder 19 is configured such that volume adjustment is possible by, for example, building in a variable resistor. The encoder 19 is fixed to the circuit board 18 and is connected to a circuit of the circuit board 18. Further, the encoder 19 includes a screw unit 191 and a rotary shaft 192.

The screw unit 191 extends upward from a main body part of the encoder 19 mounted to the circuit board 18 and is inserted through the hole provided in the shielding case 172 and screwed by a bolt 23. The encoder 19 is fixed to the shielding case 172 by screwing the screw unit 191 with the bolt 23.

The rotary shaft 192 is a shaft that is disposed coaxially with the screw unit 191 in a rotatable manner and extends upward from a top part of the screw unit 191. The rotary shaft 192 is fitted to a recessed part 110 provided to the operation knob 11. By this configuration, the operation knob 11 and the rotary shaft 192 rotate integrally about an axis A1 shown in the figure.

The feeding loop 20 is a conducting wire disposed annularly and is connected to the radio communication circuit of the circuit board 18 via the coaxial cable 201. As shown in FIG. 3, the feeding loop 20 is disposed annularly along a plane P1, and a center of the annular ring coincides with the axis A1 (the specific axis). One end surface of the feeding loop 20 is connected to an internal conductor of the coaxial cable 201 and the other end thereof is connected to an external conductor of the coaxial cable 201. The feeding loop 20 receives a current having a prescribed frequency from the coaxial cable 201 and runs the received current to the conducting wire that is disposed annularly. Note that while it has been described above that the center of the annular ring of the feeding loop 20 coincides with the axis A1, it does not necessarily have to coincide with the axis A1.

The feeding loop 20 is fitted in a groove disposed on the top surface of the spacer 21. The coaxial cable 201 extends downward from a part thereof that is connected to the feeding loop 20 along the groove provided to the spacer 21, passes a cavity 173 provided in the shielding case 172, and is connected to the circuit board 18. Note that the axis A1 is orthogonal to the plane P1. The plane P1 is set so as to be parallel to the top surface of the electronic device 10.

The spacer 21 is disposed on the recessed part provided to the shielding case 172 and supports the feeding loop 20 outside the shielding case 172. The spacer 21 is formed of resin. By having the feeding loop 20 supported at the top surface of the spacer 21, the feeding loop 20 of the electronic device 10 can be fixed at a desired position outside the shielding case 172. Further, by forming the spacer 21 of soft resin, the electronic device 10 can suppress intrusion of water and dust into the shielding case 172.

The top surface of the spacer 21 coincides with the plane P1. The plane P1 is set above the top surface of the shielding case 172. In other words, the plane P1 is disposed outside the shielding case 172. By setting the plane P1 in this manner, it is possible to suppress the effects of the shielding case 172 on the feeding loop 20.

Further, the plane P1 is set above an upper edge of the rotary shaft 192. The rotary shaft 192 is formed of a metal such as aluminum. Therefore, by separating the plane P1 from the rotary shaft 192 as described above, it is possible to suppress the effects of the rotary shaft 192 on the feeding loop 20.

The antenna element 22 is a conductor having an open-loop shape and is formed of copper, gold or the like. As shown in FIG. 3, the antenna element 22 is a wire material spirally formed along an inclined surface of a cone, the lower part thereof being the bottom surface. The antenna element 22 includes a first end part 221, which is one of the open ends, at the lower side thereof and a second end part 222, which is the other open end, at the upper side thereof. The first end part 221 and the second end part 222 are not connected to each other by a conductive body, and thus they are in an open-loop state. By this configuration, the antenna element 22 can receive a magnetic field having a prescribed frequency from the feeding loop 20. Accordingly, the antenna element 22 can function as an antenna of the electronic device 10.

Note that the shape of the antenna element 22 is not limited to a spiral shape as long as it can form an open-loop shape. The shape and the material of the antenna element 22 are determined according to the frequency of the radio waves used by the electronic device 10 and the output thereof. Further, the first end part 221 and the second end part 222 may be connected to each other via a dielectric body or a capacitor.

As shown in FIG. 2, the operation knob 11 is configured to be rotatable around the axis A1. The axis A1 passes the center of the annular ring formed by the feeding loop 20 and is orthogonal to the plane P1. Further, the antenna element 22 is fixed to the inside of the operation knob 11. Therefore, even when the operation knob 11 is rotated, the relative positional relationship between the feeding loop 20 and the antenna element 22 does not change. Accordingly, the characteristics of the antenna of the electronic device 10 do not change even when the operation knob 11 is operated. Note that the antenna element 22 may be bonded or press-fitted to the operation knob 11 or may be fixed to the operation knob 11 by insert molding when the operation knob 11 is formed by injection-molding.

The embodiments of the present disclosure have been described above. The electronic device 10 according to the embodiments has the antenna element 22 disposed inside the operation knob 11. Therefore, there is no need to dispose a whip antenna that protrudes from the case of the electronic device 10. Further, with this configuration, the part of the electronic device 10 that protrudes from the antenna device 10 can be reduced. Further, the antenna element 22 fixed to the operation knob 11 does not come in contact with the feeding loop 20. Further, the antenna element 22 does not wear out or is not deformed even when the operation knob 11 is rotated. Thus, the electronic device 10 has a simple and durable structure. According to the embodiments of the present disclosure, an electronic device having an antenna function in an electronic device having functions of transmitting/receiving radio waves can be provided without having to enlarge the size of the device.

Note that the present disclosure is not limited to the embodiments described above and can be modified as appropriate without departing from the gist of the present disclosure. For example, the electronic device described above can be applied to devices that perform reception or transmission of radio waves such as a portable transmitter, a portable receiver, a portable radio, a smartphone, and a mobile phone, in addition to a transceiver.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An electronic device comprising:
a shielding case configured to block passage of electromagnetic waves;
a feeding loop which is a conductor disposed annularly along a prescribed plane outside the shielding case and connected to a radio communication circuit encompassed within the shielding case;
an operation knob configured to be rotatable around a specific axis that passes through an annular ring formed by the feeding loop; and
an antenna element which is an open-loop conductor fixed to the operation knob.

2. The electronic device according to claim 1, wherein
the antenna element is disposed outside the shielding case, and
the feeding loop is disposed between the antenna element and the shielding case.

3. The electronic device according to claim 1, wherein the antenna element further comprises a capacitor configured to connect open ends of the open-loop conductor to each other.

4. The electronic device according to claim 1, further comprising an encoder fitted to the operation knob, wherein the encoder and the plane formed by the feeding loop are spaced apart from each other.

5. The electronic device according to claim 1, further comprising a spacer configured to support the feeding loop outside the shielding case.

* * * * *